Oct. 21, 1958     O. F. HOFER     2,857,185
ROTARY COUPLING
Filed Oct. 30, 1953

INVENTOR.
OTTMAR F. HOFER
BY
ATTORNEYS

United States Patent Office 2,857,185
Patented Oct. 21, 1958

2,857,185

ROTARY COUPLING

Ottmar F. Hofer, Fort Wayne, Ind., assignor to International Telephone and Telegraph Corporation.

Application October 30, 1953, Serial No. 389,252

3 Claims. (Cl. 287—1)

The present invention relates to a rotary coupling, and more particularly to a mechanism for coupling a rotatable driving member to a driven member without use of securing type connections.

In electronic equipment wherein certain circuit components of the adjustable type are contained within pressurized or the like enclosures, it is necessary to operate such components from the exterior of the enclosure. Various devices have been proposed and used for coupling the external control to the internal component, but these devices of which knowledge is had require manipulative disassembly of the coupling which is tedious and time-consuming.

In view of the foregoing, it is an object of this invention to provide a rotary coupling of the nature described in the foregoing which does not require any positive assembling attachment, but which may be assembled by merely installing the component part into the enclosure.

It is a further object to provide a rotary coupling composed of driving and driven parts which may be assembled in predetermined angular relationship by mere engagement between the driving and driven members.

Other objects which become apparent as the disclosure proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
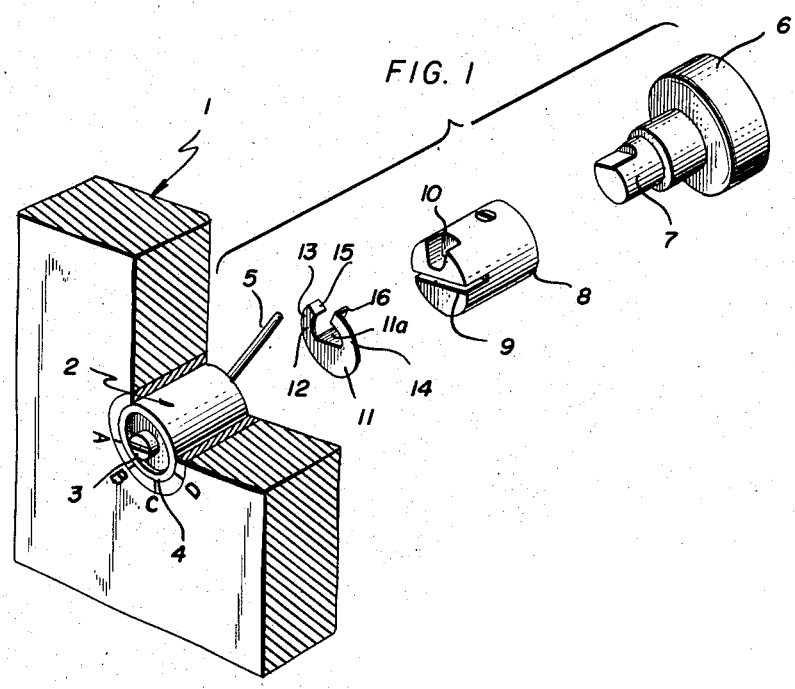
Figure 1 is a fragmentary sectional exploded view of one embodiment of this invention.

Referring to the drawings, the wall of a pressurized container is indicated generally by the reference numeral 1 and is shown as supporting a conventional rotary driving mechanism 2 which is hermetically sealed into the wall 1. The mechanism 2 may be of any suitable design wherein the rotating part 3 is hermetically sealed inside the stationary, tubular supporting carrier 4. Operatively secured for corresponding rotation to the inner end of the rotary member 3 is an angularly offset arm 5.

The illustrated component to be controlled by operation of the rotary member 3 is an ordinary rotary type switch 6 having the usual shaft 7 on which may be mounted a coupling 8. In the front face of the coupling 8 is formed a diametral slot 9 and a radially offset socket portion 10.

Figure 3:
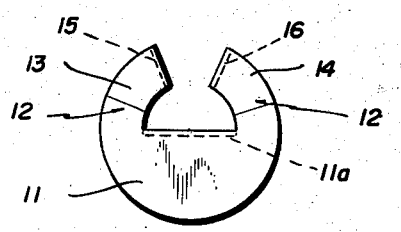
Figure 3 is a front elevation of the part of Figure 2.
Figure 2:
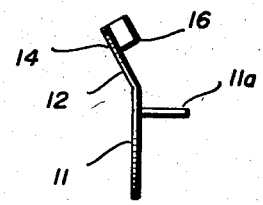
Figure 2 is a side elevation of one part thereof.

A cam element 11, preferably formed of spring metal, is substantially disc-shaped and is provided with an angular cam surface 12 composed of two arcuate segments 13 and 14 (Figures 2 and 3). The two arcuate portions 13 and 14 are formed by lancing the central portion of the disc 11 in part-circular form so as to provide an axially extending lip 11a (Figure 2). The adjacent ends of the arcuate arms 13 and 14 are bent inwardly to form the two ears 15 and 16, respectively.

The lip 11a is assembled on the diametral slot 9 of the coupling 8 and the ears 15 and 16 are received by the coupling socket 10. Preferably, the disc 11 is soldered to the front face of the coupling 8 to prevent accidental dislodgment of the two parts.

Assuming that the component assembly 6, 8, 11 is to be installed in the enclosure of the wall 1, the only necessary manipulation is the insertion of this particular assembly into the enclosure until the disc 11 is brought into contact with the end of the angular arm 5. Of course the axes of rotation of the switch 6 and the external shaft 3 must coincide. It makes no difference as to which portion of the disc 11 is contacted by the end of arm 5. The next step merely is to rotate the shaft 3 while continuing to urge the assembly 6, 8 and 11 axially toward wall 1 thereby causing the end of the arm 5 to radially slide over the engaged arcuate segment 13 or 14 until the arm 5 coincides with the space between the two segments 13 and 14. Rotation of the arm 5 over the segments 13 or 14 causes the latter to be biased inwardly toward the front face of the coupling 8. After the arm 5 has radially traversed one or the other of the segments 13 or 14, it falls between the segment ends and may extend into socket 10 depending upon the axial movement of the assembly in response to the aforesaid axial urging whereupon the two segments 13 and 14 spring outwardly to their normal position to straddle circumferentially the end of arm 5 thereby locking the arm 5 in driving position; arm 5 thereafter rotatably drives coupling 8 and switch 6 responsive to rotation of shaft 3 by engagement with the ears 14 and 15 of disc 11.

Component registration between the rotated position of the switch 6 and the particular rotated position of the rotary member 3 as well as ease of assembly are simultaneously accomplished.

For example, assuming that the switch 6 has four possible switching positions, the front face of wall 1 could be correspondingly indexed around the perimeter of the mechanism 2. In coupling the assembly 6, 8, 11 to the mechanism 2, since the rotary part 3 must be rotated to a position which corresponds to the rotated position of the switch before the arm 5 will fall into the space between segments 13 and 14 for locking the parts together and forming a driving connection between arm 5 and segments 13 and 14, proper indexing of the mechanism 2 in indicating the rotated position of the switch 6 is automatically provided.

What is claimed is:

1. A rotary coupling detachably assembled together comprising a member to be rotated, a cam element secured to said member, said cam element having a resilient axial cam surface normally spaced from said member with a driving connection portion formed therefrom, and a rotatable driving member having an initial position in radial slidable engagement with said cam surface and a second position in engagement with said driving connection portion whereby rotation of said rotatable member serves rotatably to drive said first-mentioned member.

2. A rotary coupling detachably assembled together comprising a member to be rotated, a cam element secured to said member, said cam element being disc-shaped and having an angularly arranged axial cam surface formed with an opening communicating with the outer periphery thereof, said cam surface being normally yieldably spaced from said member, and a rotatable driving member having an initial position in radial slidable engagement with said cam surface and a second position in said opening in driving engagement with the sides thereof whereby rotation of said driving member serves to rotate said first-mentioned member.

3. A rotary coupling detachably assembled together comprising a rotatable driven part having a slot in one face thereof, an intermediate resilient connecting disc having an axially extending lip projecting into said slot, said disc further having circumferentially spaced arcuate segments which present cam surfaces normally angularly arranged with respect to the plane of said disc, and a rotatable driving arm extending at an angle with respect to the axis of rotation of said driven part and rotatable about said axis, the outer end of said arm having an initial position in radial slidable engagement with one of said arcuate segments and biasing the same toward said driven part, said outer end of said arm having a second position in the space between said segments with said segments normally arranged to straddle circumferentially said arm and in driving engagement therewith whereby rotation of said arm imparts rotary motion to said intermediate disc for driving said driven part.

References Cited in the file of this patent

UNITED STATES PATENTS

| | | |
|---|---|---|
| 1,226,161 | Anthony | May 15, 1917 |
| 2,100,232 | Barry | Nov. 23, 1937 |
| 2,128,729 | Murphy | Aug. 30, 1938 |
| 2,128,730 | Murphy | Aug. 30, 1938 |